(12) United States Patent
Adil et al.

(10) Patent No.: US 11,030,759 B2
(45) Date of Patent: Jun. 8, 2021

(54) METHOD FOR CONFIDENT REGISTRATION-BASED NON-UNIFORMITY CORRECTION USING SPATIO-TEMPORAL UPDATE MASK

(71) Applicant: ASELSAN ELEKTRONIK SANAYI VE TICARET ANONIM SIRKETI, Ankara (TR)

(72) Inventors: Omer Faruk Adil, Ankara (TR); Huseyin Seckin Demir, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 17/047,072

(22) PCT Filed: Apr. 27, 2018

(86) PCT No.: PCT/TR2018/050194
§ 371 (c)(1),
(2) Date: Oct. 13, 2020

(87) PCT Pub. No.: WO2019/209194
PCT Pub. Date: Oct. 31, 2019

(65) Prior Publication Data
US 2021/0090273 A1 Mar. 25, 2021

(51) Int. Cl.
*G06T 7/38* (2017.01)
*G06T 7/32* (2017.01)
(Continued)

(52) U.S. Cl.
CPC .............. *G06T 7/38* (2017.01); *G06T 5/002* (2013.01); *G06T 5/20* (2013.01); *G06T 5/50* (2013.01);
(Continued)

(58) Field of Classification Search
CPC .. G06T 7/32; G06T 5/002; G06T 5/50; G06T 5/20; G06T 7/0002; H04N 5/2176;
(Continued)

(56) References Cited

U.S. PATENT DOCUMENTS

| 7,856,137 B2 * | 12/2010 | Yonezawa | G06K 9/6204 382/136 |
| 8,564,724 B2 * | 10/2013 | Hong | H04N 5/2176 348/614 |

(Continued)

OTHER PUBLICATIONS

Junjie Zeng et al., "Adaptive Image-Registration-Based Nonuniformity Correction Algorithm With Ghost Artifacts Eliminating for Infrared Focal Plane Arrays" (Year: 2015).*

(Continued)

*Primary Examiner* — Mekonen T Bekele
(74) *Attorney, Agent, or Firm* — Bayramogiu Law Offices LLC

(57) ABSTRACT

A scene-based non-uniformity correction method to achieve a fixed-pattern noise reduction and eliminate ghosting artifacts based on robust parameter updates via a confident inter-frame registration and spatio-temporally consistent correction coefficients. The method includes the steps of: Assessing an input image frame whether the input image frame has a sufficient scene detail for registrations to prevent false registrations originated from low-detail scenes, calculating horizontal and vertical translations between frames to find a shift, introducing a scene-adaptive registration quality metric to eliminate erroneous parameter updates resulting from unreliable registrations and applying a Gaussian mixture model (GMM)-based temporal consistency restriction to mask out unstable updates in non-uniformity correction parameters.

9 Claims, 5 Drawing Sheets

(51) Int. Cl.
| | |
|---|---|
| *G06T 5/00* | (2006.01) |
| *G06T 5/20* | (2006.01) |
| *G06T 5/50* | (2006.01) |
| *G06T 7/00* | (2017.01) |

(52) U.S. Cl.
CPC .............. *G06T 7/0002* (2013.01); *G06T 7/32* (2017.01); *G06T 2207/10048* (2013.01); *G06T 2207/20182* (2013.01); *G06T 2207/30168* (2013.01)

(58) Field of Classification Search
CPC ...... H04N 5/361; H04N 5/365; H04N 5/3656; H04N 5/33
See application file for complete search history.

(56) References Cited

U.S. PATENT DOCUMENTS

| | | | | |
|---|---|---|---|---|
| 2013/0321671 A1* | 12/2013 | Cote | ...................... | H04N 5/365 348/241 |
| 2013/0321675 A1* | 12/2013 | Cote | ...................... | H04N 9/045 348/242 |
| 2014/0294287 A1* | 10/2014 | Guo | ........................ | G06T 7/536 382/154 |
| 2016/0050372 A1* | 2/2016 | Lindner | .................... | G06T 7/33 348/46 |

OTHER PUBLICATIONS

Mou, Xin-gang et al., "Nonuniformity correction algorithm based on Gaussian mixture model" (Year: 2011).*
Fan Fan et al., "A combined temporal and spatial deghosting technique in scene based nonuniformity correction" (Year: 2015).*
Juntao Guana et al., "Fixed pattern noise reduction for infrared images based on cascade residual attention CNN" (Year: 2019).*
David L Perry et al., Linear theory of nonuniformity correction in infrared staring sensors, Optical Engineering, Aug. 1993, pp. 1854-1859, vol. 32, No. 8.
Esteban Vera et al., Total variation approach for adaptive nonuniformity correction in focal-plane arrays, Optics Letters, Jan. 15, 2011, pp. 172-174, vol. 36, No. 2.
Abraham Friedenberg et al., Nonuniformity two-point linear correction errors in infrared focal plane arrays, Optical Engineering, Apr. 1998, pp. 1251-1253, vol. 37, No. 4.
Sungho Kim, Two-point correction and minimum filter-based nonuniformity correction for scan-based aerial infrared cameras, Optical Engineering, 2012, pp. 1-13, 106401, vol. 51, No. 10.
Dean A Scribner et al., Adaptive nonuniformity correction for IR focal-plane arrays using neural networks, SPIE, 1991, pp. 100-109, vol. 1541.
Lai Rui et al., Improved neural network based scene-adaptive nonuniformity correction method for infrared focal plane arrays, Applied Optics, Aug. 20, 2008, pp. 4331-4335, vol. 47, No. 24.
John G Harris et al., Minimizing the ghosting artifact in scene-based nonuniformity correction, SPIE, 1998, pp. 106-113, vol. 3377.
Russell C Hardie et al., Scene-Based Nonuniformity Correction with Reduced Ghosting Using a Gated LMS Algorithm, Optics Express, 2009, pp. 14918-14933, vol. 17, No. 17.
Bradley M Ratliff et al., Generalized algebraic scene-based nonuniformity correction algorithm, J. Opt. Soc. Am. A, Feb. 2005, pp. 239-249, vol. 22, No. 2.
Sergio N Torres et al., Kalman filtering for adaptive nonuniformity correction in infrared focal plane arrays, J. Opt. Soc. Am. A, Mar. 2003, pp. 470-480, vol. 20, No. 3.
Chao Zuo et al., New Temporal High-Pass Filter Nonuniformity Correction Based on Bilateral Filter, Optical Review, 2011, pp. 197-202, vol. 18, No. 2.
Alessandro Rossi et al., Bilateral filter-based adaptive nonuniformity correction for infrared focal-plane array systems, Optical Engineering, May 2010, pp. 1-13, 057003, vol. 49, No. 5.
Junjie Zeng et al., Adaptive Image-Registration-Based Nonuniformity Correction Algorithm With Ghost Artifacts Eliminating for Infrared Focal Plane Arrays, IEEE Photonics Journal, 2015, pp. 1-16, vol. 7, No. 5.
Russell C Hardie et al., Scene-based nonuniformity correction with video sequences and registration, Applied Optics, 2000, pp. 1241-1250, vol. 39, No. 8.
Chao Zuo et al., Scene-based nonuniformity correction algorithm based on interframe registration, J. Opt. Soc. Am. A, 2011, pp. 1164-1176, vol. 28, No. 6.
Azwitamisi E Mudau et al., Non-Uniformity Correction and Bad Pixel Replacement on LWIR and MWIR Images, Saudi International Electronics, Communications and Photonics Conference (SIECPC), 2011, pp. 1-5.
Jan Portmann et al., People Detection and Tracking from Aerial Thermal Views, in 2014 IEEE International Conference on Robotics and Automation (ICRA), May 2014, pp. 1794-1800.
Thermal Infrared Dataset, http://projects.asl.ethz.ch/datasets/doku.php?id=ir:iricra2014.
Mou Xin-Gang et al., Nonuniformity correction algorithm based on Gaussian mixture model, Proc. of SPIE, 2011, pp. 81933Z1-8, vol. 819.
Zhe Liu et al., Nonuniformity Correction Based on Adaptive Sparse Representation Using Joint Local and Global Constraints Based Learning Rate, IEEE Access, 2018, 10822-10839, vol. 6.
Sergio K Sobarzo et al., Real-Time Kalman Filtering for Nonuniformity Correction on Infrared Image Sequences: Performance and Analysis, CIARP, LNCS, 2005, pp. 752-761.

* cited by examiner

GLMS
 IRLMS
 GE-NUC
 CORESUM

GLMS

IRLMS

GE-NUC

CORESUM

METHOD FOR CONFIDENT REGISTRATION-BASED NON-UNIFORMITY CORRECTION USING SPATIO-TEMPORAL UPDATE MASK

CROSS REFERENCE TO THE RELATED APPLICATION

This application is the national stage entry of International Application No. PCT/TR2018/050194, filed on Apr. 27, 2018, the entire contents of which are incorporated herein by reference.

TECHNICAL FIELD

The present disclosure relates to a scene-based non-uniformity correction method to achieve better fixed-pattern noise reduction and eliminate ghosting artifacts based on robust parameter updates via confident inter-frame registration and spatio-temporally consistent correction coefficients.

BACKGROUND

Infrared imagery has been used in various fields such as military, medical, surveillance and numerous industrial branches. One of the main problems with commonly used focal plane arrays (FPA) is the fixed pattern noise (FPN) formed by the non-uniform response of detector elements [1]. As a solution to this problem, there are two main approaches, namely, calibration based and scene based non-uniformity correction (NUC) methods. Calibration based methods [1-4] traditionally use reference uniform surfaces to correct non-uniform detector responses. These methods are preferred due to their simplicity and computational efficiencies. However, they are not very convenient during operational use, since they require additional equipment and interrupt the video flow. On the other hand, the family of scene based methods [5-13] deal with non-uniformity problem using only scene content, which alleviates the operational problems of calibration based methods. Because of these benefits, there are considerable amount of studies utilizing scene based approaches.

One of the early works uses neural network (NN) structure to update calibration coefficients [5] without any consideration of scene content. Naturally, this approach will suffer from ghosting artifacts due to the assumption that all pixel elements will have a similar temporal average which does not always hold. There are other constant-statistics assumption based methods that further improve on this work [6]. However, they have similar drawbacks that result in ghosting artifacts. Some of the recent studies [13-15] employ inter-frame registration to match scene content which notably decreases the ghosting artifacts. Despite the success of [15] in reducing the artifacts, moving objects in the scene, motion blur and registration errors still remain as a problem. In [13], Zeng et al. made further improvement by introducing a spatial update mask from residual registration errors. This mask is used to selectively update the correction coefficients in order to reduce ghosting artifacts. Although this work significantly limits the artifacts, there are several issues that might still stand as problems. One problem is that there might be a global registration error especially in low-detail frames. The method applies certain restrictions only within the error image between frames and does not examine whether the registration is performed correctly. In mis-registration cases, severe ghosting artifacts may occur. Additionally, there is no mechanism to prevent temporally inconsistent updates possibly caused by registration errors.

SUMMARY

The proposed invention offers a method for confident registration-based non-uniformity correction using spatio-temporal update mask. The confident registrations are achieved by introducing a scene adaptive registration quality metric to discard erroneous updates. A Gaussian mixture model (GMM)-based spatio-temporal update mask is utilized to selectively refine the estimations of correction coefficients. The results of experiments on an extensive dataset consisting of both synthetically corrupted data and real infrared videos show that the proposed algorithm achieves superior performance in PSNR (Peak Signal-to-Noise Ratio) and roughness metrics with notably lower ghosting artifacts when compared to other state-of-the-art methods.

Our contribution is two-fold. The first one is that we eliminate erroneous parameter updates resulting from unreliable registrations. The second one is that we employ a temporal consistency restriction on the correction coefficients to further eliminate unstable parameter updates.

In our method, we aim to address the remaining ghosting artifact problems by introducing a scene-adaptive registration quality metric to achieve a confident registration before updating any non-uniformity parameter estimation. We first assess the input image frame whether it is eligible for registration in terms of sufficient scene detail. This prevents false registrations originated from low-detail scenes. Then we require a certain amount of translation to ensure a sufficient statistical variation. After those restrictions, we then assure that there is no considerably large global registration error utilizing the introduced scene-adaptive registration quality metric. These restrictions could cause to discard too many useful frames, however, by introducing an adaptive frame delay mechanism, we provide a way to efficiently wait for a good candidate frame with sufficient translation and acceptable registration errors. Finally, for any remaining errors that might produce artifacts, we utilize a GMM-based temporal consistency restriction that masks out statistically unstable updates in non-uniformity correction parameters.

In conclusion, the present invention introduces a new scene-based NUC method that yields better performance by making more accurate FPN estimates and by eliminating ghosting artifacts utilizing spatio-temporally consistent FPN estimation update mechanisms. In essence, the proposed algorithm tries to eliminate erroneous FPN estimates by the assessment of registration errors, amount of shift between images and temporal consistency of FPN characteristics. The results of the experimentations show that a better performance in FPN correction without ghosting artifacts is achieved in an extensive dataset.

DETAILED DESCRIPTION OF THE EMBODIMENTS

Figure 1:
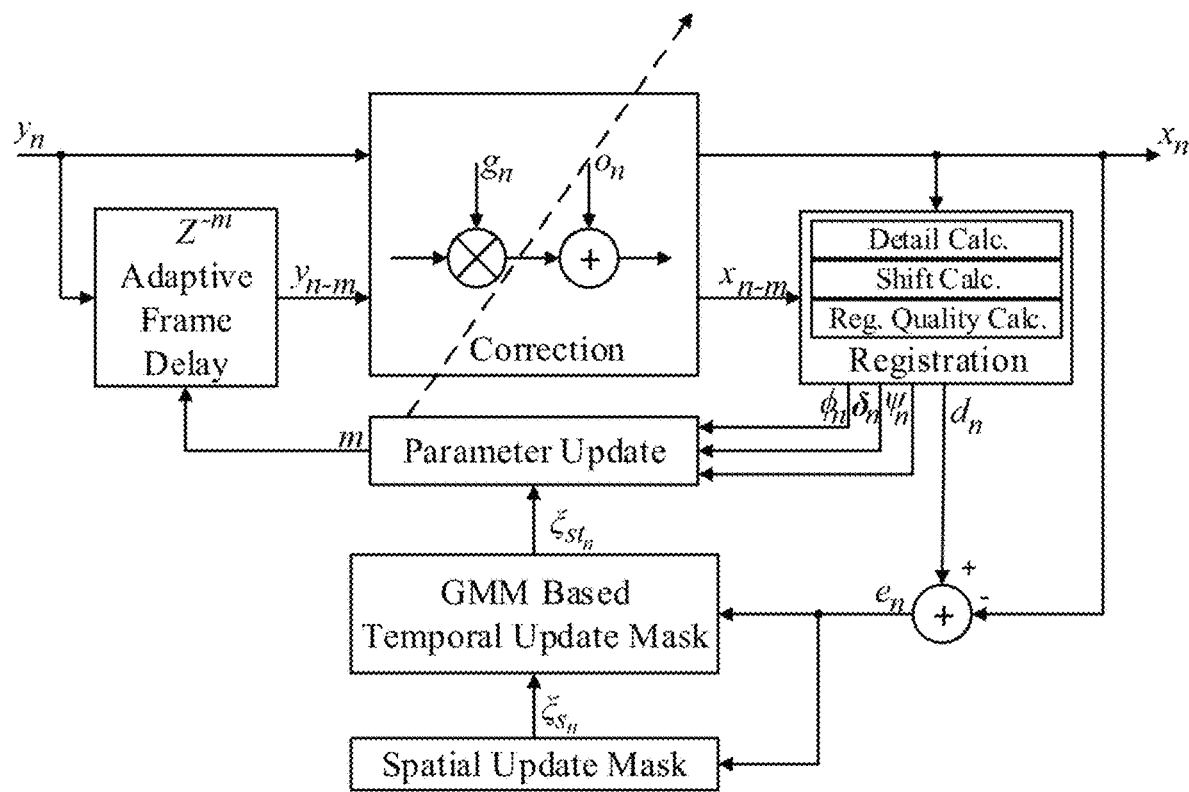
FIG. 1 shows a block diagram of the present invention.

The present invention relates to a confident image registration based non-uniformity correction algorithm that utilizes a spatio-temporal update mask. A block diagram demonstrating the flow of the algorithm is given in FIG. 1.

1. Observation Model

In order to model the response of infrared detector pixels, the common linear model approach is utilized [1]. According to this model, the observed output signal is represented by a linear function of true response as given in (1):

$$y_n(i,j) = x_n(i,j) \cdot a_n(i,j) + b_n(i,j) \quad (1)$$

where $x_n$ is the true response for the $n^{th}$ frame, $y_n$ is the associated detector output signal, (i, j) is the pixel coordinates and a and b are the gain and offset coefficients.

Based on this model, true response can also be written as a linear function of the detector output as shown in (2):

$$x_n(i,j) = y_n(i,j) \cdot g_n(i,j) + o_n(i,j) \quad (2)$$

where backward gain $g_n(i,j)$ is equal to $1/a_n(i,j)$ and backward offset $o_n(i,j)$ is equal to $-b_n(i,j)/a_n(i,j)$.

According to this model, the observed signal is corrected by using the backward gain and offset coefficients. These coefficients can be estimated using different techniques. In the proposed method, inter-frame registration is performed with adaptive frame delay and least mean squares (LMS) minimization is used for estimating the gain and offset coefficients.

2. Registration

In frame registration based non-uniformity correction approaches, the main assumption is that the different pixels must produce the same response to the same scene data. Since the fixed pattern noise is a slowly varying signal, this assumption can be used for estimating the correction coefficients iteratively using LMS minimization [8]. For this purpose, the first step is to find the correct registration between the frames.

Linear model parameters are initialized by setting gain values to 1 and offset values to 0. After obtaining the corrected signals $x_n$ and $x_{n-m}$, the horizontal shift $\delta_{xn}$ and the vertical shift $\delta_{yn}$ between these signals are calculated. In the registration block, the image detail magnitude $\Phi_n$ and the registration quality value $\xi_n$ are calculated for ignoring the problematic registrations caused by various reasons such as lack of scene details, motion blur and camera rotation. In other words, the correction parameters are updated only when a confident registration is achieved. This selective update approach is an important process for eliminating ghosting artifacts. Details of each sub-block are given in the following subsections.

2.1. Scene Detail Calculation

In order to achieve a reliable registration, sufficient scene detail must be present. Otherwise, matching can be erroneous due to low signal-to-noise ratio. Therefore, the registration and the other parameter update steps are skipped to ensure a robust registration quality, if the newly arrived frame does not contain sufficient scene detail ($\Phi_n < T_\Phi$).

For a given frame, scene detail magnitude $\varphi_n$ is calculated as given in (3):

$$\phi_n = \frac{1}{WH}\left(\|x_n * h\|_2^2 + \|x_n * h^T\|_2^2\right) \quad (3)$$

where W is frame width, H is frame height, h is horizontal edge filter kernel and * is discrete convolution operation. In our implementation, 9×9 extension of horizontal Sobel kernel is used as the edge filter.

2.2. Inter-Frame Shift Calculation

Instead of using 1-D projections of intensity values for shift calculation as in [13], we employ 1-D projections of edge image which provides more robust registration performance in scenes with rich edge content. Since the edge image is already calculated in (3) for detail calculation, we efficiently obtain the 1-D projections in vertical and horizontal directions as shown in (4):

$$P_n^x(j) = \sum_{i=1}^{W} E_n(i, j),$$

$$P_n^y(i) = \sum_{j=1}^{H} E_n(i, j) \quad (4)$$

where $E_n$ represents the edge image calculated as shown in (5):

$$E_n(i, j) = \left(\sum_{k=-r}^{r}\sum_{l=-r}^{r} x_n(i-k, j-l)h(k, l)\right)^2 + \left(\sum_{k=-r}^{r}\sum_{l=-r}^{r} x_n(i-k, j-l)h^T(k, l)\right)^2 \quad (5)$$

where h is the edge filter of size r×r used in Scene Detail Calculation.

In order to calculate the shift between the current and delayed images, normalized cross correlation of the projection vectors are calculated as shown in (6):

$$\gamma_x(i) \triangleq \sum_x \frac{(P_{n-m}^y(i+x) - \overline{P_{n-m}^y})(P_n^y(x) - \overline{P_n^y})}{\sigma P_n^y \sigma P_{n-m}^y}$$

$$\gamma_y(j) \triangleq \sum_y \frac{(P_{n-m}^x(j+y) - \overline{P_{n-m}^x})(P_n^x(y) - \overline{P_n^x})}{\sigma P_n^x \sigma P_{n-m}^x} \quad (6)$$

where $\overline{P_n^x}$ and $\overline{P_n^y}$ are the means and $\sigma P_n^x$ and $\sigma P_n^y$ are the standard deviations of the projection vectors $P_n^x(j)$ and $P_n^y(i)$, respectively. Similar definitions apply for the projection vectors for the delayed frame as well.

Shift in x and y directions are than retrieved as shown in (7):

$$\delta_x = \underset{i}{\operatorname{argmax}}\gamma_x(i)$$

$$\delta_y = \underset{j}{\operatorname{argmax}}\gamma_y(j) \quad (7)$$

2.3. Registration Quality Assessment

One of the major sources of the erroneous model updates is the registration errors that stem from the violation of pure translation assumption. To overcome such problems, we utilize a registration quality measure that discards the frame pairs which have relatively large global registration error compared to scene detail magnitude. In other words, we introduce an adaptive metric that shows relative registration quality with respect to scene detail magnitude. The registration quality measure is defined as shown in (8):

$$\psi_n = \frac{\phi_n}{\frac{1}{WH}\sum_{i,j} |E_n(i,j) - E_{n-1}(i+\delta_x, j+\delta_y)|} \quad (8)$$

This metric favors the registrations where the error magnitude is a small fraction of scene detail magnitude. Registrations with lower quality measure than a certain threshold $T_v$ are discarded at the parameter update step.

3. Non-Uniformity Correction Model Update

In general, the observation model discussed above is updated as the minimization of the LMS problem stated in [5] as given in (9):

$$a_{n+1}(p,q) = a_n(p,q) - \eta_1 \cdot e_n(p,q) \cdot y_n(p,q) \cdot \xi_{st_n}(p,q)$$

$$b_{n+1}(p,q) = b_n(p,q) - \eta_2 \cdot e_n(p,q) \cdot \xi_{st_n}(p,q) \quad (9)$$

where, subscripts n and n+1 represents the current and next frame indices, (p, q) represents the index range within the registered overlap region between the delayed and current image, $\eta_1$ and $\eta_2$ are the learn rates for the gain and offset updates, $e_n$ is the error image between the corrected current frame and the delayed frame, $y_n$ is the current input frame and $\xi_{st_n}$ is the spatio-temporal update mask which determines pixel locations at which the observation model will be updated.

It is noted that there is a 2-pass update for the model which exploits the fact that the registered overlapping regions of the delayed and current frames coincide with different pixel locations of the FPA. Thus, it is possible to update the gain and offset coefficients for two pixel locations instead of one by repeating the update step in both directions.

The calculation of the error map $e_n$ and spatio-temporal update mask $\xi_{st_n}$ will be detailed in further sections.

3.1. Error Map Calculation

The error map yields the error between the intensities read from different FPA pixel locations for the same scene content assuming the registration error is sufficiently small. This information provides the difference between the FPA element responses at different locations. The error calculation is performed on the corrected signals as given in (10):

$$e_n(i,j) = x_{n-m}(i+\delta_x, j+\delta_y) - x_n(i,j) \quad (10)$$

3.2. Spatial Mask for Model Update

Although the generated error maps in 3.1 to find non-uniform responses, unfortunately, not all error values are valid due to residual registration errors, moving objects in the scene and so forth. As an a priori information, non-uniformity characteristics for each pixel in an FPA does not vary radically; unless they are defective [16]. Based on this, erroneous updates can be further avoided in addition to the elimination of global registration errors explained in Section 2.3. This is achieved by masking out the outlier error values on the previously calculated error map as given in (11):

$$\xi_{s_n}(p,q) = \begin{cases} 1 & \text{if } (e_n(p,q) - \mu_{e_n})) < (c\sigma_{e_n})) \\ 0 & \text{otherwise} \end{cases} \quad (11)$$

where, c is the constant for $\sigma$ distance which determines the outlier threshold. $\mu_{e_n}$ and $\sigma_{e_n}$ are the mean and standard deviation of the error map, respectively.

3.3. GMM-Based Temporal Mask for Model Update

Up to this point, we have generated an update mask that avoids global registration errors and spatially inconsistent non-uniformity errors. As a final precaution for erroneous model parameter updates, we exploit the fact that FPN has an approximately constant behavior over time [7]. Thus, any update that would yield radically different model parameters is considered invalid and masked out from calculations. Analogous to the background subtraction domain, we could model residual FPN in the registration error map as fixed background and model other temporally inconsistent errors as the foreground. As a commonly applied solution to background subtraction problem, GMM could be successfully used to detect and eliminate the error components that do not belong to FPN. The GMM update steps are given in the following equations:

$$\Delta(i,j) = e_n(i,j) - \mu_{GMM_n}(i,j) \quad (12)$$

$$\xi_{st_n}(i,j) = \begin{cases} \xi_{s_n}(i,j) & \text{if } \Delta(i,j)^2 < \lambda\sigma^2_{GMM_n}(i,j) \\ 0 & \text{otherwise} \end{cases} \quad (13)$$

$$\mu_{GMM_{n+1}}(i,j) = \mu_{GMM_n}(i,j) + \alpha_1\Delta(i,j) + \xi_{st_n}(i,j) \quad (14)$$

$$\text{var}_{GMM_{n+1}} = \sigma^2_{GMM_{n+1}}(i,j) \quad (15)$$
$$= \sigma^2_{GMM_n}(i,j)$$
$$+ \alpha_2[\Delta(i,j)^2 - \sigma^2_{GMM_n}(i,j)]\xi_{st_n}(i,j)$$

where $\xi_{st_n}$ represents the spatio-temporal update mask computed using GMM model. $\mu_{GMM}$ and $\sigma^2_{GMM}$ are the mean image and variance image kept by the GMM. They are initialized by using the spatially masked regions ($\xi_{s_n}$) of the first input image frame. Also, $\lambda$ is the temporal variance threshold coefficient, $\alpha_1$ is the update learn rate for the GMM mean image and $\alpha_2$ is the learn rate for the GMM variance image.

4. Adaptive Frame Delay

In order to obtain a robust registration between the frames, a minimum magnitude of inter-frame shift and scene detail is required. If these conditions do not hold for the incoming frames, we drop them and wait for a better candidate for the parameter update. In other words, delay between two registration frames is not necessarily one, but can take values between one and $m_{max}$. When the maximum frame delay $m_{max}$ is reached before finding a suitable image frame, the process restarts with new initial frame.

5. Process Steps of the Invention

The observation model for the fixed pattern noise on infrared (IR) image is considered to be consisting of a multiplicative gain terms and additive offset terms. If these terms are found then the fixed pattern noise is estimated and can be corrected from the noisy image to obtain an uncorrupted clean image. In the following steps, our aim is to find these correction terms.

After the IR image is captured by a sensing device, the algorithms first starts a registration process between image frames. The first step of this process is to check whether the frames to be registered contain sufficient detail information. This step is necessary to avoid erroneous registrations caused by insufficient detail in the images. It is checked by applying a Sobel filter to extract the average magnitude of edge information in the images. Then this information is compared with a suitable threshold. If the scene detail is lower than the threshold, the algorithms do not proceed to registration steps. This way, registration performance is improved by avoiding the potentially erroneous registrations.

The images with sufficient scene detail are then used to find a shift between the frames. For the registration, the 1-D horizontal was used and vertical projections of the edge maps generated from the original frames using edge extraction filter. Then the 1-D projection vectors are matched using cross-correlation. This way, horizontal and vertical translations between the frames are calculated.

Even after the scene detail assessment, the registration performance may still not be as good as desired. Hence, a registration quality metric is defined to quantify the registration performance. This metric is found by calculating the ratio of average registration error and the average scene detail magnitude. Average registration error is simply the frame difference between the edge maps of the frames and scene detail magnitude is readily calculated. This ratio is expected to be small for good registration, hence, a threshold is used for this metric and discontinue registration process if this metric is smaller than the designated threshold. This step helps to reduce errors caused by poor registration performance.

After these steps, two sufficiently well registered image frames are obtained. These frames provide same image region measured from different sensor pixels within the registered overlap region. Using the assumption that same regions should produce same responses in the imaging pixels, non-uniformity errors can be found. Using these errors, gain and offset correction terms can be updated. Due to the fact that fixed pattern noise does not change at a fast rate, the updates with a slow learning rate is made to avoid premature convergence. Also, not all the pixels are updated at once. There are spatial and temporal consistency masks to determine which pixel locations are to be updated. The use of both the spatial and temporal constraints provides robustness to the non-uniformity correction terms updates. This is a novel approach to reduce the ghosting artifacts produced by erroneous estimations of the correction terms.

In order to update non-uniformity correction terms, the error map between sensor element responses in the overlap regions of two shifted frames is found. The error map is simply the difference of the overlap regions of the two frames.

In the fact that typical behavior of fixed pattern noise does not change radically between pixels in an IR image sensor. Hence, it can be deduced that error values that are too different from its neighboring pixels are probably caused by erroneous calculations. These errors are mostly caused by scene changes that violate the translation assumption such as motion blur, non-rigid scene motion and so forth. Therefore, the pixels that have error map values deviating from its local neighborhood with a certain amount is marked. The marked pixels are considered spatially inconsistent and hence the correction terms for the corresponding pixels are not updated.

Another characteristic of the fixed pattern noise is that it has an approximately constant behavior over limited time durations. Using this information, the temporal variation of the error map values is constrained. If temporal variation is higher that a factor of variance threshold, it can be considered that error map values are not valid and correction terms for such pixel locations are not updated. This is achieved by the use of Gaussian Mixture Models. Analogous to background subtraction case, consistent error map values are considered as background and temporally changing error map values are considered as moving foreground. Then, the deviations of error map values from the temporal mean value estimations are found. These deviations are compared against the thresholds which are a factor of temporal variance estimations. The pixels with higher temporal error map deviations are masked out and the correction terms at these locations are not updated. The temporal mean and variance estimations are also updated at the non-masked pixel locations for iteratively improving the GMM mean and variance estimations similar to the update mechanism of non-uniformity correction terms.

When any of the conditions detailed in abovementioned steps, then the current couple of frames are not valid to find correction term updates. In such cases, one could drop both frames and wait for another couple of consecutive frames which would satisfy the constraints. However, this may not always be necessary. If the first frame has sufficient scene detail but registration performance is not satisfactory, then we can keep the first frame and wait only for another second frame until a maximum number of trials is reached. This way, one not only try to register the consecutive frames, but also the frames with more than one frame delay. This adaptive frame delay strategy for registration ensures not to unnecessarily drop frames and provides faster convergence for the estimation of non-uniformity correction terms.

6. Experiments

The proposed method is compared against the state-of-the-art scene-based NUC methods: GE-NUC [13], IRLMS [15] and GLMS [8]. The evaluation is carried out with an extensive dataset containing synthetically corrupted clean IR images from a public dataset (ETH-ASL Thermal Image Dataset [17]) and uncorrected IR images with FPN captured with various IR detectors. The performance comparison is conducted using the objective metrics described in the following section.

6.1. Performance Metrics

The experiments are performed on both images with synthetically added noise and real noisy thermal images. For synthetically corrupted images, Peak Signal-to-Noise Ratio (PSNR) metric is used which measures the error between the expected (clean) reference image and the image corrected by the scene based NUC methods. PSNR calculation is given in (16):

$$\text{PSNR} = 10 \log_{10}(\text{peakval}^2/\text{MSE}) \tag{16}$$

where, MSE is the mean-squared-error between the output and target images and peakval is the maximum value that the input signal can take.

For the real fixed pattern noise case, however, PSNR metric cannot be calculated, since the clean reference images are not available. In the literature, roughness metric which measures the high frequency component of the image is commonly used [13]. Roughness metric $\rho$ is calculated as given in (17):

$$\rho = \frac{\|\hat{X} * h\|_2 + \|\hat{X} * h'\|_2}{\|\hat{X}\|_2} \tag{17}$$

where, $\hat{X}$ is the corrected image frame, h=[−0.5, 0.5] is the horizontal high-pass filter kernel and $h^T$ is the vertical version of the kernel.

6.2. Dataset

In a scene-based NUC study, the dataset variety is vital in terms of both the scene content and different detector responses. In the experiments, our objective is to prevent over-fitting to some limited data and observe the behavior of the methods in possible failure scenarios. Thus, we would like to observe the effects of scene contents, camera motion, detector characteristics and noise characteristics.

We used two different datasets in our experiments. The first dataset is ETH-ASL Thermal Image Dataset [17] which is publicly available [18]. This dataset has a rich scene content involving people, animals, buildings, cars, terrain, sky, etc. The images are recorded using a FLIR Tau 320 camera with a resolution of 324×256 and bit-depth of 16-bits. The clean images in this dataset is corrupted by a synthetic Gaussian noise of $\mu=0$ and $\sigma=10$. In order for the synthetic FPN to be more realistic, the amount of noise is gradually increased from 60% to 100% of the full scale. There are 7 sequences having a total of 3409 frames in the selected dataset.

The second dataset is a collection of images recorded using ASELSAN thermal imagers with a resolution of 640×512 and bit-depth of 16-bits. There are both hand-held and pan-tilt camera images in the dataset containing a variety of scenes such as terrain, sky, buildings, trees, people and so forth. In total, there are 5 sequences having 3785 frames. The image sequences have real uncorrected FPN so that the methods are evaluated in physical world conditions.

6.3. Results

The experimentation results are assessed both objectively by comparing the PSNR and roughness measurements and subjectively by observing the correction performances and ghosting artifacts.

Figure 2:
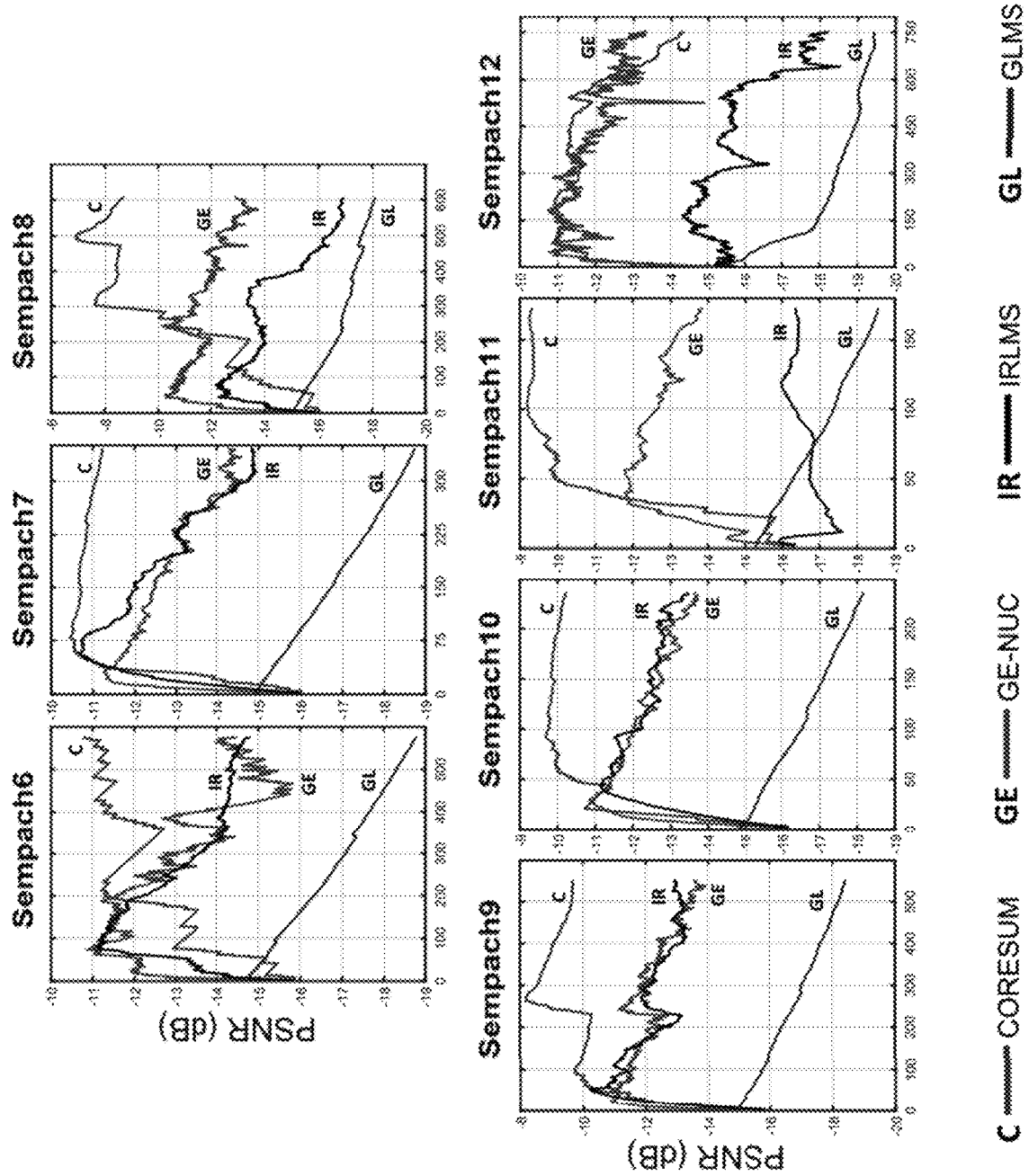
FIG. 2 shows PNSR performance of the evaluated methods. The titles of the plots represent the image sequence names as given in the original ETH-ASL Thermal Image Dataset [17].

In FIG. 2, PSNR plots of each method are given for all frames of each data sequence in ETH-ASL [17] dataset. The main reason for a detailed plot is that the performance loss caused by the ghosting artifacts or false FPN estimations in the middle sections of the image sequences would not be observable by inspecting only the average PSNR values for the whole sequence. Another benefit of these plots is that the convergence of the methods are easily visible. It is noted that the proposed method produces the best PSNR results in all sequences for all frames after its late convergence. The strategy of the proposed method is clearly imprinted on the PSNR characteristics. Our method assesses all the conditions such as registration quality, frame shift amount, scene detail magnitude and temporal consistency. If all the requirements are matched, only then a noise estimation update is performed.

This strategy provides more accurate estimations at the expense of fewer estimation updates. The stability of the estimations of our algorithm is also reflected on the PSNR curve showing no oscillation unlike the compared methods. For a brief summary, average PSNR values for each sequence and overall average for the whole dataset are given in Table 1.

TABLE 1

PSNR Performance Comparison (dB)

|  | GLMS | IRLMS | GE-NUC | CORESUM |
| --- | --- | --- | --- | --- |
| Sempach6 | −16.86 | −13.32 | −13.14 | −12.33 |
| Sempach7 | −16.93 | −12.82 | −12.91 | −11.17 |

TABLE 1-continued

PSNR Performance Comparison (dB)

|  | GLMS | IRLMS | GE-NUC | CORESUM |
| --- | --- | --- | --- | --- |
| Sempach8 | −16.87 | −14.48 | −11.81 | −10.51 |
| Sempach9 | −16.84 | −12.32 | −12.22 | −9.72 |
| Sempach10 | −16.64 | −12.47 | −12.41 | −10.38 |
| Sempach11 | −17.02 | −16.59 | −12.87 | −10.67 |
| Selnpach12 | −18.41 | −15.77 | −11.96 | −11.84 |
| Average | −17.22 | −13.99 | −12.37 | −11.08 |

Due to the fact that the roughness metric is highly scene-dependent, the values are usually close and characteristics of the methods are somewhat similar. The proposed method again produces the best (lowest) roughness values in overall performance for each data sequence. This result is given in the average roughness values given in Table 2.

TABLE 2

Roughness Performance Comparison ($\rho$)

|  | GLMS ($\times 10^{-3}$) | IRLMS ($\times 10^{-3}$) | GE-NUC ($\times 10^{-3}$) | CORESUM ($\times 10^{-3}$) |
| --- | --- | --- | --- | --- |
| Seq01 | 4.809 | 4.801 | 4.798 | 4.651 |
| Seq02 | 4.292 | 4.115 | 3.984 | 3.883 |
| Seq03 | 3.171 | 2.887 | 2.927 | 2.883 |
| Seq04 | 14.318 | 13.159 | 12.977 | 11.994 |
| Seq05 | 1.453 | 1.276 | 1.205 | 1.130 |

Figure 3:
FIG. 3 shows ghosting artifacts comparison among the evaluated methods executed on a dataset.
Figure 3:
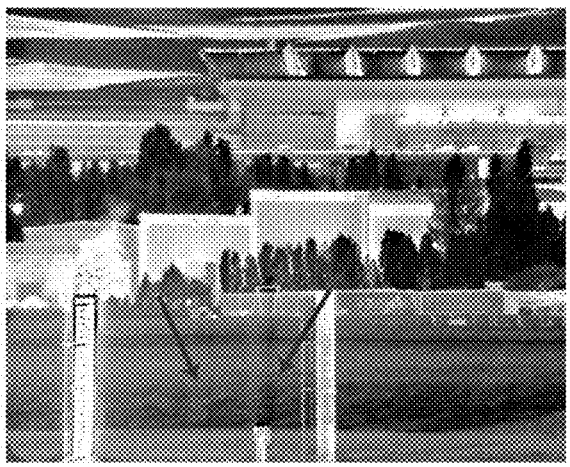
Figure 3:
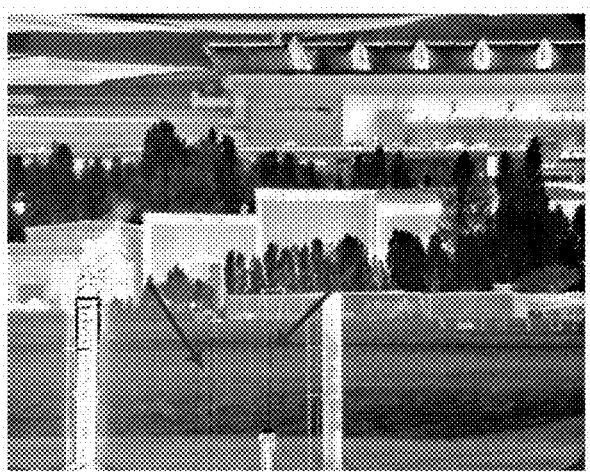
Figure 3:
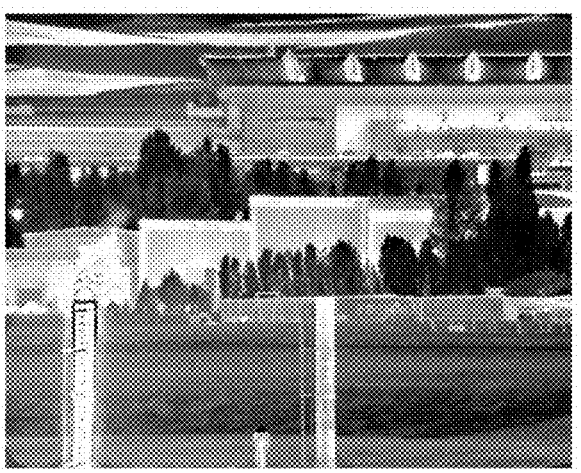
Figure 4:
FIG. 4 shows ghosting artifacts visible in the error images that belongs to the frames shown in FIG. 3.
Figure 4:
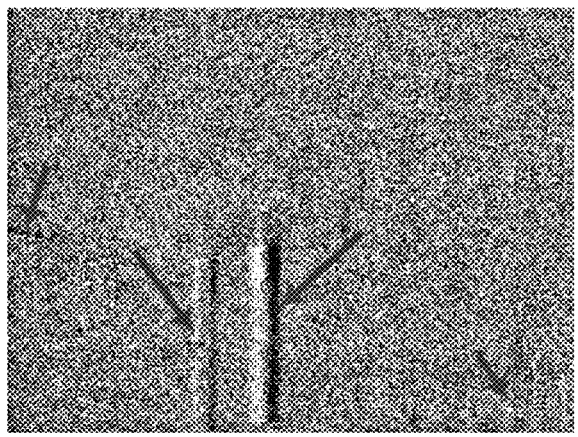
Figure 4:
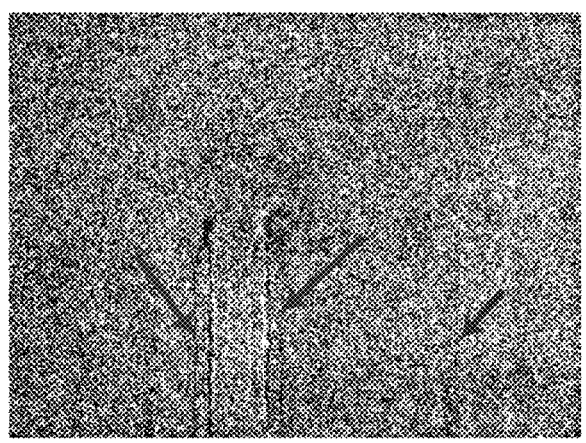
Figure 4:
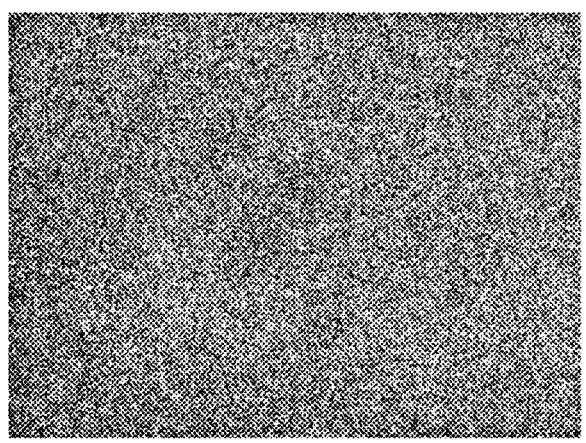

In the scene-based NUC domain, ghosting artifacts are the arch enemies of the algorithms. One of the main contributions of our method is the elimination of such artifacts, thus, it is useful to view some exemplary cases for the evaluated methods. FIG. 3 depicts the ghosting artifacts produced by the compared methods. Although quite visible in the output images of the algorithms, it is easier to note the ghosting artifacts in the error correction images (difference of output image and original image) in FIG. 4. For other images, the artifacts are burnt into the corrections while no such artifacts are observed for our method.

Figure 5:
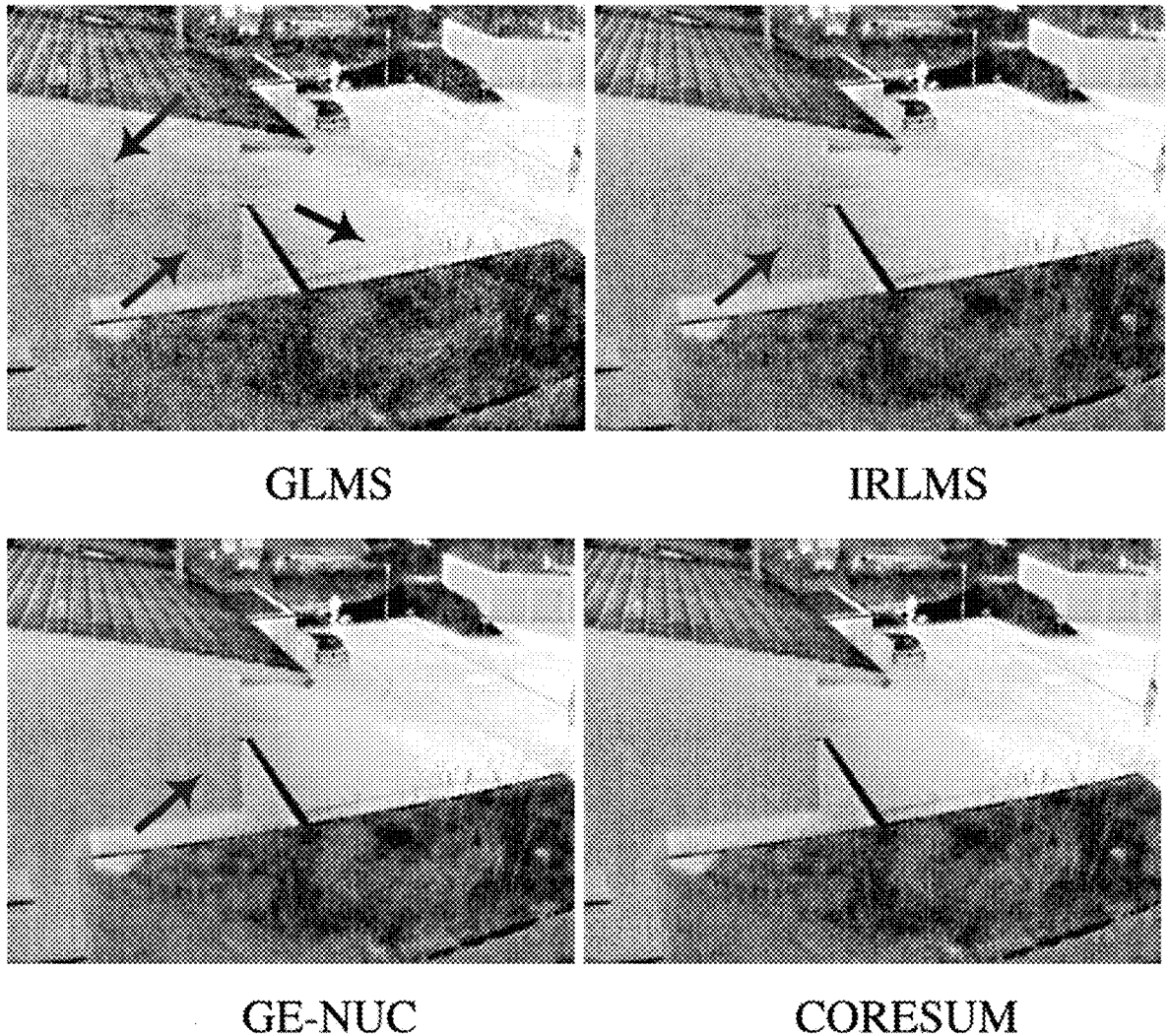
FIG. 5 shows comparison of ghosting artifacts among the evaluated methods executed on the ETH-ASL dataset [17].

Similar ghosting artifacts could be seen in the ETH-ASL public dataset [17] results given in FIG. 5. Again, it is noted that our method does not yield any noticeable ghosting artifact whereas others do at different scales.

REFERENCES

[1] David L Perry and Eustace L Dereniak, "Linear theory of nonuniformity correction in infrared staring sensors," *Optical Engineering*, vol. 32, no. 8, pp. 1854-1860, 1993.

[2] Esteban Vera, Pablo Meza, and Sergio Torres, "Total variation approach for adaptive nonuniformity correction in focal-plane arrays," *Optics letters*, vol. 36, no. 2, pp. 172-174, 2011.

[3] Abraham Friedenberg and Isaac Goldblatt, "Nonuniformity two-point linear correction errors in infrared focal plane arrays," *Optical Engineering*, vol. 37, no. 4, pp. 1251-1254, 1998.

[4] Sungho Kim, "Two-point correction and minimum filter-based nonuniformity correction for scan-based aerial infrared cameras," *Optical Engineering*, vol. 51, no. 10, pp. 106401-106401, 2012.

[5] Dean A Scribner, Kenneth A Sarkady, Melvin R Kruer, John T Caulfield, J D Hunt, and Charles Herman, "Adaptive nonuniformity correction for it focal plane arrays using neural networks," in *Proc. SPIE*, 1991, vol. 1541, pp. 100-109.

[6] Lai Rui, Yang Yin-Tang, Zhou Duan, and Li Yue-Jin, "Improved neural network based scene-adaptive nonuniformity correction method for infrared focal plane arrays," *Applied optics*, vol. 47, no. 24, pp. 4331-4335, 2008.

[7] John G Harris and Yu-Ming Chiang, "Minimizing the ghosting artifact in scene-based nonuniformity correction," in *Proc. SPIE*, 1998, vol. 3377, pp. 106-113.

[8] Russell C Hardie, Frank Baxley, Brandon Brys, and Patrick Hytla, "Scene-based nonuniformity correction with reduced ghosting using a gated 1 ms algorithm," *Optics express*, vol. 17, no. 17, pp. 14918-14933, 2009.

[9] Bradley M Ratliff, Majeed M Hayat, and J Scott Tyo, "Generalized algebraic scene-based nonuniformity correction algorithm," *JOSA A*, vol. 22, no. 2, pp. 239-249, 2005.

[10] Sergio N Torres and Majeed M Hayat, "Kalman filtering for adaptive nonuniformity correction in infrared focal plane arrays," *JOSA A*, vol. 20, no. 3, pp. 470-480, 2003.

[11] Chao Zuo, Qian Chen, Guohua Gu, and Weixian Qian, "New temporal high-pass filter nonuniformity correction based on bilateral filter," *Optical Review*, vol. 18, no. 2, pp. 197-202, 2011.

[12] Alessandro Rossi, Marco Diani, and Giovanni Corsini, "Bilateral filter-based adaptive nonuniformity correction for infrared focal-plane array systems," *Optical Engineering*, vol. 49, no. 5, pp. 057003-057003, 2010.

[13] Junjie Zeng, Xiubao Sui, and Hang Gao, "Adaptive image-registration-based nonuniformity correction algorithm with ghost artifacts eliminating for infrared focal plane arrays," *IEEE Photonics Journal*, vol. 7, no. 5, pp. 1-16, 2015.

[14] Russell C Hardie, Majeed M Hayat, Earnest Armstrong, and Brian Yasuda, "Scene-based nonuniformity correction with video sequences and registration," *Applied Optics*, vol. 39, no. 8, pp. 1241-1250, 2000.

[15] Chao Zuo, Qian Chen, Guohua Gu, and Xiubao Sui, "Scene-based nonuniformity correction algorithm based on interframe registration," *JOSA A*, vol. 28, no. 6, pp. 1164-1176, 2011.

[16] A. E. Mudau, C. J. Willers, D. Griffith, and F. P. J. le Roux, "Non-uniformity correction and bad pixel replacement on lwir and mwir images," in 2011 *Saudi International Electronics, Communications and Photonics Conference (SIECPC)*, April 2011, pp. 1-5.

[17] J. Portmann, S. Lynen, M. Chli, and R. Siegwart, "People detection and tracking from aerial thermal views," in 2014 *IEEE International Conference on Robotics and Automation (ICRA)*, May 2014, pp. 1794-1800.

[18] http://projects.asl.ethz.ch/datasets/doku.php?d=ir:iricra2014.

What is claimed is:

1. A method for a scene-based non-uniformity correction to achieve a fixed-pattern noise reduction and eliminate ghosting artifacts in an infrared imagery, comprising the steps of:

assessing an input infrared image frame for scene detail for registrations to prevent false registrations that originated from low-detail scenes, calculating horizontal and vertical translations between the input infrared image frames to find a shift, introducing a scene-adaptive registration quality metric to eliminate erroneous parameter updates resulting from unreliable registrations, applying a Gaussian mixture model (GMM)-based temporal consistency restriction to mask out unstable updates in non-uniformity correction parameters;

wherein the horizontal and vertical translations between the input infrared image frames are calculated by using 1-D horizontal and vertical projections of edge maps generated from original input infrared image frames using an edge extraction filter and matching 1-D projection vectors using a cross-correlation;

wherein the 1-D horizontal and vertical projections are calculated with the equations:

$$P_n^x(j) = \sum_{i=1}^{W} E_n(i, j),$$

$$P_n^y(j) = \sum_{j=1}^{H} E_n(i, j);$$

wherein $p_n^x(j)$ is the horizontal projection vector and $P_n^y(i)$ is the vertical projection vector;

where $E_n$ represents an edge image calculated as:

$$E_n(i, j) = \left(\sum_{k=-r}^{r} \sum_{l=-r}^{r} x_n(i-k, j-l)h(k, l)\right)^2 + \left(\sum_{k=-r}^{r} \sum_{l=-r}^{r} x_n(i-k, j-l)h^T(k, l)\right)^2;$$

where $x_n$ is the true response for the $n^{th}$ input infrared image frame and h is an edge filter of size r×r used in a scene detail calculation.

2. The method according to claim 1, wherein a sufficiency of scene detail is checked by applying a Sobel kernel as an edge filter to extract an average magnitude of edge information in the input infrared image frames and comparing the edge information with a threshold.

3. The method according to claim 1, wherein a shift between current and delayed images in x and y directions are calculated with equations:

$$\delta_x = \underset{i}{\mathrm{argmax}}\, \gamma_x(i);$$

$$\delta_y = \underset{j}{\mathrm{argmax}}\, \gamma_y(j);$$

where a normalized cross correlation of the 1-D projection vectors are calculated as:

$$\gamma_x(i) \triangleq \sum_x \frac{(P_{n-m}^y(i+x) - \overline{P_{n-m}^y})(P_n^y(x) - \overline{P_n^y})}{\sigma p_n^y \sigma p_{n-m}^y};$$

$$\gamma_j(j) \triangleq \sum_y \frac{(P_{n-m}^x(i+x) - \overline{P_{n-m}^y})(P_n^y(x) - \overline{P_n^y})}{\sigma p_n^x \sigma p_{n-m}^x};$$

where $\overline{P_n^x}$ and $\overline{P_n^y}$ are means and $\sigma P_n^x$ and $\sigma P_n^y$ are standard deviations of the 1-D projection vectors $P_n^x(j)$ and $P_n^y(i)$, respectively.

4. The method according to claim 1, wherein an error calculation is performed on the corrected signals as:

$$e_n(i,j) = x_{n-m}(i+\delta_x, j+\delta_y) - x_n(i,j);$$

wherein $x_n$ is a true response for an $n^{th}$ frame, and $\delta_x$ and $\delta_y$ are a shift between current and delayed images in x and y directions and are calculated with equations:

$$\delta_x = \underset{i}{\mathrm{argmax}}\, \gamma_x(i);$$

$$\delta_y = \underset{j}{\mathrm{argmax}}\, \gamma_y(j).$$

5. The method according to claim 4, comprising the step of masking out outlier error values on a calculated error map to avoid erroneous updates in addition to an elimination of global registration errors by using the equation:

$$\xi_{s_n}(p,q) = \begin{cases} 1 & \text{if } (e_n(p,q) - \mu_{e_n})) < (c\sigma_{e_n})) \\ 0 & \text{otherwise} \end{cases};$$

where, c is a constant for σ distance, wherein the constant for the σ distance determines an outlier threshold, $\mu_{e_n}$ and are a mean and a standard deviation of an error map, respectively.

6. A method for a scene-based non-uniformity correction to achieve a fixed-pattern noise reduction and eliminate ghosting artifacts in an infrared imagery, comprising the steps of:
assessing an input infrared image frame for scene detail for registrations to prevent false registrations that originated from low-detail scenes;
calculating horizontal and vertical translations between the input infrared image frames to find a shift;
introducing a scene-adaptive registration quality metric to eliminate erroneous parameter updates resulting from unreliable registrations;
applying a Gaussian mixture model (GMM)-based temporal consistency restriction to mask out unstable updates in non-uniformity correction parameters;
wherein an observation model for a fixed pattern noise on the input infrared image frames is:

$$y_n(i,j) = x_n(i,j) \cdot a_n(i,j) + b_n(i,j);$$

wherein the fixed pattern noise on the input infrared image frames consists of multiplicative gain terms and additive offset terms to be found for estimating and correcting the fixed pattern noise to obtain an uncorrupted clean image, where $x_n$ is a true response for an $n^{th}$ frame, $y_n$ is an associated detector output signal, (i, j) is pixel coordinates and a and b are gain and offset coefficients;
further comprising the steps of:
performing an inter-frame registration with an adaptive frame delay and using a least mean squares (LMS) minimization for estimating the gain and offset coefficients; and
updating the observation model as a minimization of the LMS problem:

$$a_{n+1}(p,q) = a_n(p,q) - \eta_1 \cdot e_n(p,q) \cdot y_n(p,q) \cdot \xi_{st_n}(p,q);$$

$$b_{n+1}(p,q) = b_n(p,q) - \eta_2 \cdot e_n(p,q) \cdot \xi_{st_n}(p,q);$$

wherein subscripts n and n+1 represents current and next frame indices, (p, q) represents an index range within a registered overlap region between a delayed image and a current image, $\eta_1$ and $\eta_2$ are learn rates for gain and offset updates, $e_n$ is an error image between a corrected current frame and a delayed frame, $y_n$ is a current input frame and $\xi_{st_n}$ is a spatio-temporal update mask, wherein the spatio-temporal update mask determines pixel locations, wherein the observation model is configured to be updated at the pixel locations.

7. The method according to claim 6, wherein a GMM-based update is applied by using equations:

$$\Delta(i,j) = e_n(i,j) - \mu_{GMM_n}(i,j);$$

$$\xi_{st_n}(i,j) = \begin{cases} \xi_{s_n}(i,j) & \text{if } \Delta(i,j)^2 < \lambda \sigma^2_{GMM_n}(i,j) \\ 0 & \text{otherwise} \end{cases};$$

$$\mu_{GMM_{n+1}}(i,j) = \mu_{GMM_n}(i,j) + \alpha_1 \Delta(i,j) + \xi_{st_n}(i,j);$$

$$\mathrm{var}_{GMM_{n+1}} = \sigma^2_{GMM_{n+1}}(i,j)$$
$$= \sigma^2_{GMM_n}(i,j)$$
$$+ \alpha_2 [\Delta(i,j)^2 - \sigma^2_{GMM_n}(i,j)] \xi_{st_n}(i,j);$$

where $\xi_{st_n}$ represents the spatio-temporal update mask computed using a GMM model, $\mu_{GMM}$ and $\sigma^2_{GMM}$ are a mean image and a variance image kept by the GMM, $\xi_{s_n}$ states spatially masked regions of a first input infrared image frame, λ is a temporal variance threshold coefficient, $\alpha_1$ is an update learn rate for the mean image kept by the GMM and $\alpha_2$ is the update learn rate for the variance image kept by the GMM.

8. A method for a scene-based non-uniformity correction to achieve a fixed-pattern noise reduction and eliminate ghosting artifacts in an infrared imagery, comprising the steps of:
assessing an input infrared image frame for scene detail for registrations to prevent false registrations that originated from low-detail scenes;
calculating horizontal and vertical translations between the input infrared image frames to find a shift;
introducing a scene-adaptive registration quality metric to eliminate erroneous parameter updates resulting from unreliable registrations;
applying a Gaussian mixture model (GMM)-based temporal consistency restriction to mask out unstable updates in non-uniformity correction parameters;
wherein a scene detail magnitude, $\Phi_n$, is calculated:

$$\phi_n = \frac{1}{WH}(\|x_n * h\|_2^2 + \|x_n * h^T\|_2^2);$$

where W is a frame width, H is a frame height, where $x_n$ is a true response for an $n^{th}$ frame, h is a horizontal edge filter kernel and * is a discrete convolution operation.

9. The method according to claim 8, wherein an adaptive metric showing a relative registration quality with respect to scene detail magnitudes is defined as:

$$\psi_n = \frac{\phi_n}{\frac{1}{WH}\sum_{i,j}|E_n(i,j) - E_{n-1}(i+\delta_x, j+\delta_y)|};$$

and the registrations with a lower quality measure than a certain threshold are discarded at a parameter update step;

wherein $E_n$ represents an edge image calculated as:

$$E_n(i, j) = \left(\sum_{k=-r}^{r}\sum_{l=-r}^{r} x_n(i-k, j-l)h(k, l)\right)^2;$$
$$+ \left(\sum_{k=-r}^{r}\sum_{l=-r}^{r} x_n(i-k, j-l)h^T(k, l)\right)^2;$$

wherein h is an edge filter of size r×r used in a scene detail calculation.

* * * * *